WILLIAM H. HOLLAND.

Improvement in Metallic Stuffing Boxes.

No. 125,569.                  Patented April 9, 1872.

UNITED STATES PATENT OFFICE.

WILLIAM H. HOLLAND, OF BOSTON, MASSACHUSETTS.

IMPROVEMENT IN METALLIC STUFFING-BOXES.

Specification forming part of Letters Patent No. 125,569, dated April 9, 1872.

SPECIFICATION.

Figure 1:
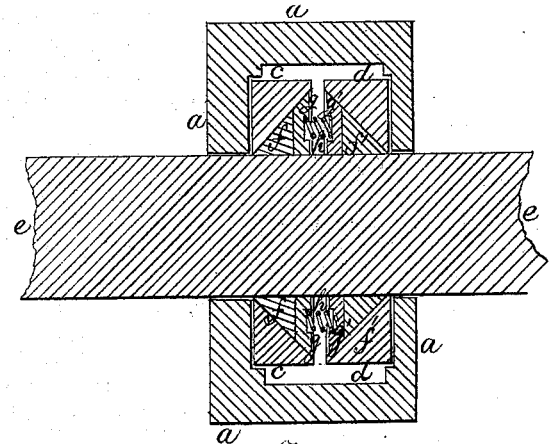
Figure 2:
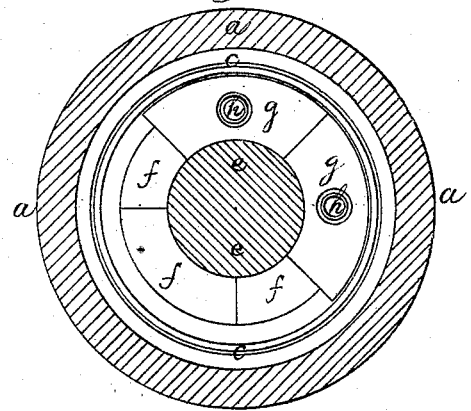
Figure 3:
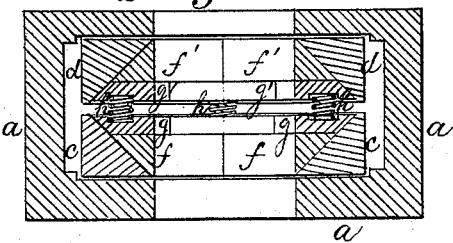

I, WILLIAM H. HOLLAND, of Boston, in the county of Suffolk and State of Massachusetts, have invented certain Improvements in Metallic Stuffing-Boxes, of which the following is a specification:

Figure 1 of the drawing is a central vertical longitudinal section of my improved stuffing-box. Fig. 2 is a central vertical transverse section, showing the interior of the stuffing-box with two segments of one of its rings removed. Fig. 3 is the same as Fig. 1, with the rod removed.

The present invention relates to certain new and useful improvements in metallic stuffing-boxes, having for its principal objects simplicity and economy in construction and cost, and durability and effectiveness in wear and operation. My improvements consist mainly of arranging a metallic stuffing-box with either one or two rings, beveled on the interior, and containing rings formed of peculiar-shaped segments arranged to break joints with each other, and operated by springs, so as to take up any wear on the rod, and prevent the escape of steam, &c., between or over the joints, as will be hereinafter more fully described.

$a\ a\ a\ a$ in the drawing represent the case of a metallic stuffing-box, within which, at each end, is a ring, $c\ c\ d\ d$, with a beveled inner periphery, fitting against which and a rod, $e\ e$, is a ring formed of wedge-shaped segments $f\ f\ f'\ f'$, whose joints are covered by a ring formed by flat annular segments $g\ g\ g'\ g'$, with beveled outer rims which fit against the beveled inner periphery of the rings $c\ c\ d\ d$. The flat segments $g\ g\ g'\ g'$ are countersunk on the face to receive springs $h\ h\ h$, which play between and against the said segments $g\ g\ g'\ g'$, and press both the series of segments $g\ g\ g'\ g'\ f\ f\ f'\ f'$ tightly into the rings $c\ c$ and $d\ d$, and consequently against the rod $e\ e$, thus taking up any wear on the rod $e\ e$, and forming a perfectly steam-tight joint, with rings $c\ c$ and $d\ d$, and thereby preventing any over-escape of steam into the box $a\ a\ a\ a$.

Instead of two rings, $c\ c\ d\ d$, only one may be used, with the springs $h\ h\ h$ bearing against one end of the box $a\ a\ a\ a$; or the ring or rings $c\ c\ d\ d$ may be permanently formed on the end or ends of the interior of the box $a\ a\ a\ a$, instead of being adjustable; though I prefer, for better security, to employ two rings, arranged as shown in the model, and illustrated by the drawing, by reference to which it will readily be seen that the segments $f\ f\ f'\ f'$, breaking joints with the segments $g\ g\ g'\ g'$, precludes the possibility of the steam, &c., escaping between them; and that the segmental rings form a perfect wedge, which is by the springs $h\ h\ h$ pressed tightly, at all times, into the wedge-shaped space formed by the beveled inner periphery of the rings $c\ c$ or $d\ d$ and rod $e\ e$, thus taking up any wear on the rod, and preventing the escape of steam, &c., through the joints between the segments $f\ f\ f'\ f'\ g\ g\ g'\ g'$ and rings $c\ c$ and $d\ d$, which are kept firmly pressed against the ends of the case $a\ a\ a$ by the springs $h\ h\ h$ acting on the face of the segments $g\ g\ g'\ g'$, thus obstructing the entrance of steam, &c., at the ends of the box $a\ a\ a\ a$.

By the simple arrangement and construction of the various parts above described, it will readily be seen that my improved stuffing-box may be manufactured at a comparatively small expense, and that any wear of the several rings and segments is at once taken up by their wedge-shaped form, so that they may be used until completely worn out, and the joints are at all times tightly secured against leakage.

Having thus fully described my improvements, what I claim as my invention, and desire to have secured to me by Letters Patent, is—

1. A metallic stuffing-box, $a$, having one or two rings, $c\ d$, formed with a beveled interior periphery, the wedge-shaped segments $f\ f'$, flat segments $g\ g'$, and springs $h$, substantially as specified.

2. The flat segments $g\ g\ g'\ g'$, formed with beveled outer rims, and constituting a ring, operated by springs $h\ h\ h$ against the ring formed by the segments $f f f' f'$, and in the rings $c\ c\ d\ d$, substantially as specified.

3. The ring or rings $c\ c\ d\ d$, containing the segments $f f$ and $g\ g$ or $f'\ f'\ g'\ g'$, formed and arranged as above described, in combination with the springs $h\ h\ h$, rod $e\ e$, and stuffing-box $a\ a\ a\ a$, substantially as specified.

In testimony whereof I have signed my name to this specification in the presence of two subscribing witnesses.

WM. H. HOLLAND.

Witnesses:
SAML. M. BARTON,
CARROLL D. WRIGHT.